(12) United States Patent
Kim

(10) Patent No.: US 10,652,098 B2
(45) Date of Patent: May 12, 2020

(54) METHOD AND APPARATUS FOR DISCOVERING AND CHAINING NETWORK EXPOSURE FUNCTIONS

(71) Applicant: Samsung Electronics Co., Ltd., Suwon-si, Gyeonggi-do (KR)

(72) Inventor: Sunghoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/012,175

(22) Filed: Jun. 19, 2018

(65) Prior Publication Data
US 2019/0020549 A1  Jan. 17, 2019

(30) Foreign Application Priority Data

Jul. 11, 2017  (KR) .................. 10-2017-0087935

(51) Int. Cl.
*H04L 12/24* (2006.01)
*G06F 9/54* (2006.01)

(52) U.S. Cl.
CPC ............. *H04L 41/12* (2013.01); *G06F 9/547* (2013.01); *H04L 41/0893* (2013.01); *H04L 41/5025* (2013.01)

(58) Field of Classification Search
CPC . H04L 41/12; H04L 41/0893; H04L 41/5025; H04L 67/16; G06F 9/547; H04W 28/16; H04W 4/50; H04W 4/60
See application file for complete search history.

(56) References Cited

U.S. PATENT DOCUMENTS

| 2015/0063102 | A1* | 3/2015 | Mestery | H04L 41/12 370/230 |
| 2017/0311304 | A1* | 10/2017 | Lu | H04W 4/70 |
| 2017/0367026 | A1* | 12/2017 | Li | H04W 12/06 |

FOREIGN PATENT DOCUMENTS

| KR | 10-2018-0040290 A | 4/2018 |
| WO | 2016/045602 A1 | 3/2016 |

OTHER PUBLICATIONS

3GPP TR 23.722 v0.2.0 (May 2017).*
Huawei et al. 3GPP S6-170930, Jul. 10, 2017, 3GPP.*
Huawei et al. 3GPP S6-170933, Jul. 10, 2017, 3GPP.*
(Continued)

*Primary Examiner* — Jae Y Lee
(74) *Attorney, Agent, or Firm* — Jefferson IP Law, LLP

(57) ABSTRACT

First and second network nodes and methods thereof are provided. The method for the first network node to manage a second network node in a mobile communication system includes receiving, from a plurality of second network nodes, application programming interface (API) information related to each of the plurality of second network nodes, composing a plurality of second network node chainings based on the API information, selecting, when an API request is received from an external server, one of the plurality of second network node chainings for supporting the API request, and transmitting the API request to a second network node included in the selected second network node chaining.

16 Claims, 6 Drawing Sheets

(56) References Cited

OTHER PUBLICATIONS

Huawei et al: "CAPIF architecture enhancement", 3GPP DRAFT; S6-170933-CAPIF Architecture Enhancement-HW, 3rd Generation Partnership Project (3GPP), Mobile Competence Centre ; 650, Route Des Lucioles ; F-06921 Sophia-Antipolis Cedex ; France, vol. SA WG6, No. Malmo, Sweden, XP051310812.

"3rd Generation Partnership Project; Technical Specification Group Services and System Aspects; Study on Common API Framework for 3GPP Northbound APIs (Release 15)", 3GPP DRAFT; S6-170937_23.722-CAPIF-Editorials-23722-020 CL, 3rd Generation Partnership Project (3GPP), Mobile Competence Centre; 650, Route Des Lucioles; F-06921 Sophia-Antipolis Cedex; France, XP051310817.

"3rd Generation Partnership Project; Technical Specification Group Services and System Aspects; Architecture Enhancements for Service Capability Exposure (Release 13)", 3GPP Standard; 3GPP TR 23.708, 3rd Generation Partnership Project (3GPP), Mobile Competence Centre; 650, Route Des Lucioles; F-06921 Sophia-Antipolis Cedex; France, vol. SA WG2, No. V1.3.0, pp. 1-31, XP050966379.

European Search Report dated Nov. 14, 2018, issued in European Patent Application No. 18178749.0.

\* cited by examiner

METHOD AND APPARATUS FOR DISCOVERING AND CHAINING NETWORK EXPOSURE FUNCTIONS

CROSS-REFERENCE TO RELATED APPLICATION(S)

This application is based on and claims priority under 35 U.S.C. § 119(a) of a Korean patent application filed on Jul. 11, 2017, in the Korean Intellectual Property Office and assigned Serial No. 10-2017-0087935, the disclosure of which is incorporated by reference herein in its entirety.

BACKGROUND

1. Field

The disclosure relates to a communication system. More particularly, the disclosure relates to a method and apparatus for discovering and chaining network exposure functions (NEFs) to process a request from an external application server (AS).

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a "beyond 4G network," or a "post long term evolution (LTE) system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Meanwhile, discussions are underway about architecture for implementing communication with third party ASs in a $3^{rd}$ generation partnership project (3GPP) next generation communication system. This is spurring development and enhancement of methods for providing the external third part ASs with the network functions of the core network (CN) and enhancement thereof.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a network exposure functions (NEF) or service capability exposure function (SCEF) for exposing a terminal context to third party application servers (ASs) to notify them of a mobility event of the terminal, change a session of the terminal, or provide the core network (CN) of the information necessary for use by the terminal.

Another aspect of the disclosure is to provide a method for detecting connections between NEFs that connect the third party ASs supporting the network capability exposure function defined for use in a 4th-generation (4G) or 5th-generation (5G) mobile communication network and the network functions of the CN, chaining the NEFs per function, and managing the chained NEFs.

Additional aspects will be set forth in part in the description which follows and, in part, will be apparent from the description, or may be learned by practice of the presented embodiments.

In accordance with an aspect of the disclosure, a network function of the CN is provided. The network functions of the CN include functions of a specific network entity, e.g., mobility management function of an access and mobility function (AMF) entity, session management function (SMF) of a SMF entity, and a policy control function of a policy management function (PCF) entity.

Here, chaining NEFs means configuring NEFs with a set of several network functions. Each NEF connects to the CN entities and third party ASs. The disclosure defines a control function managing the NEF, and the control function establishes a connection between the third party AS and NEF and interacts with the CN network functions. In the disclosure, the third party AS may detect NEFs associated with a specific application programing interface (API), a network slice, a specific area, and a specific terminal, and communicate with the NEFs directly or indirectly to acquire terminal information, configure events, or transmit data.

The disclosure is described by way of various embodiments to propose how a third party AS discover NEFs, how the NEFs are selected and chained, how the requests for the third party AS are identified during message exchange between chained NEFs, how the messages are identified, and how a specific NEF is changed in the NEF chain.

In accordance with another aspect of the disclosure, a method for a first network node to manage at least one second network node in a mobile communication system is provided. The method includes receiving API information related to the at least one second network node from the at least one second network node, composing multiple second network node chainings based on the API information, selecting, when an API request is received from an external server, one of the second network node chainings for supporting the API request, and sending the API request to the second network nodes included in the selected second network node chaining.

In accordance with another aspect of the disclosure, a first network node for managing at least one second network node in a mobile communication system is provided. The first network node includes a communication unit configured to transmit and receive a signal and a controller configured to control to receive API information related to the at least one second network node from the at least one second network node, compose multiple second network node chainings based on the API information, select, when an API request is received from an external server, one of the second network node chainings for supporting the API request, and send the API request to the second network nodes included in the selected second network node chaining.

In accordance with another aspect of the disclosure, a method of a second node in a mobile communication system is provided. The method includes transmitting API information related to the second network node to a first network node managing at least one second network node, receiving an API request from an external service via the first network node, and processing the API request via a network function supporting the API request.

In accordance with another aspect of the disclosure, a second network node of a mobile communication system is provided. The second network node includes a communication unit configured to transmit and receive a signal and a controller configured to control to transmit API information related to the second network node to a first network node managing at least one second network node, receive an API request from an external service via the first network node, and process the API request via a network function supporting the API request.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
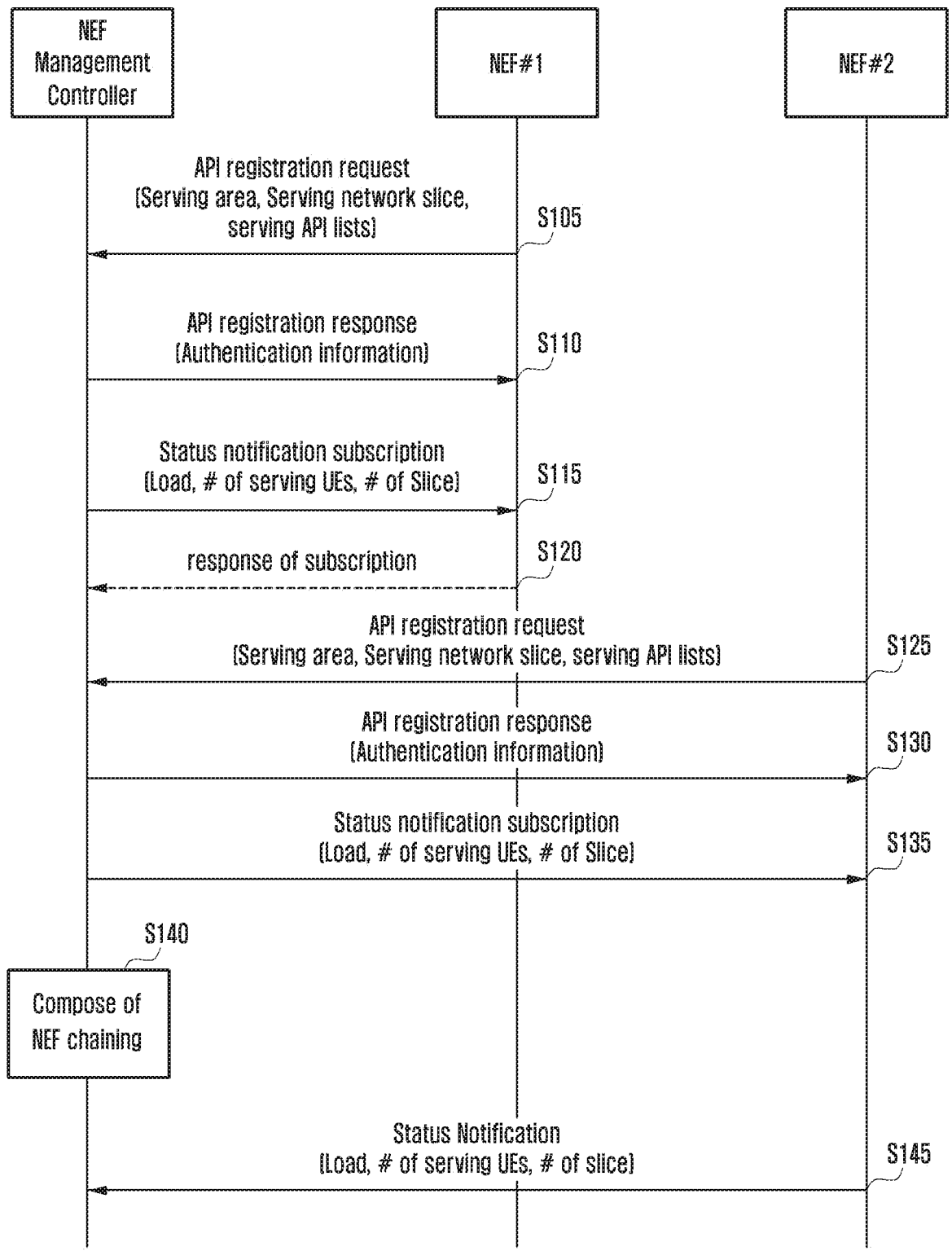
FIG. 1 is a signal flow diagram illustrating a procedure for registering application programming interfaces (APIs) for use by network exposure functions (NEFs) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed description of various embodiments and the accompanying drawings. The disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the disclosure, the term "module," means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

Although the description is directed to a new radio access network (NR) and next generation core (NG Core) as the radio access network (RAN) and core network (CN) specified in the 3rd generation partnership project (3GPP) 5th-generation (5G) network standard, particularly to the network exposure function (NEF) and service capability exposure function (SCEF) that perform a procedure with a third party application server (AS), it will be understood by those skilled in the art that the disclosure can be applied even to other communication systems having a similar technical background and channel format, with a slight modification, without departing from the spirit and scope of the disclosure. The third party AS uses functions via application programming interfaces (APIs) provided by the NEF.

In the following description, the terms and definitions given in the 3GPP long term evolution (LTE) standards are used for convenience of explanation. However, the disclosure is not limited by these terms and definitions and may be applied to other systems abiding by different standards in the same manner.

Before undertaking the detailed description of the disclosure, brief descriptions are made of the network entities and network nodes appearing in the disclosure.

The 5G CN comprises the following network functions. A mobility management function is a network function for managing terminal mobility. A session management function (SMF) is a network function for managing packet data network connectivity of the terminal. An authentication function is a network function for authenticating the terminal for use of the corresponding mobile communication network. A policy/charging function is a network function responsible for service policy and charging of the mobile communication operator to the terminal. The NEF can access terminal management information in use by the 5G network to change terminal mobility management configuration, configure terminal-mobility management context, subscribe to a mobility management event of the corresponding terminal, configure session management and session management context of the corresponding terminal, configure charging information of the terminal, and transmit small data for the corresponding terminal.

The NEF is interposed between network functions and third party ASs to relay messages, process request messages, and reply to the request messages; the messages conveying the information on capabilities that the network functions may expose to the third party AS such as terminal location, terminal reachability, terminal mobility, session in use by the terminal, and a policy applied to the terminal.

In the disclosure, the APIs are the APIs provided by the NEFs in order for the third party ASs to use or acquire the information provided by the CN functions via the APIs. In the following description, an API denotes an interface designed to make it possible for the ASs of external networks to access the network capabilities supported by the 3GPP CN That is, if a third party AS wants to locate a terminal for mobility management, it may acquire terminal location information from the CN via a related API (e.g., location-reporting API). If it is necessary to change traffic routing for a session in use by the terminal, the third party AS may request for changing the routing path for the packet data unit (PDU) session via an API supporting traffic steering (e.g., traffic steering API), the session being established by the CN for the terminal. In the disclosure, it is obvious that an API can be provided between a third party AS and an NEF management controller.

According to an embodiment of the disclosure, the NEF management controller connects to the NEFs deployed in the network to collect and manage at least one of per-NEF API lists, network slice information, and serving area information. The NEF management controller may be regraded as an NEF at the third party AS. Accordingly, the third party AS may send messages such as the message addressed to the multiple NEFs to the NEF management controller.

The third party AS may also regard the NEF management controller as an entry NEF for access to the NEFs. In this case, the NEFs may also regard the NEF management controller as another NEF and thus reuse the message or API in use by the NEF. As another example, if the NEF management controller is regarded as a network function for managing and controlling NEFs, it may be defined as a network function for use by the third party AS to connect to the NEFs or a function providing an API for connection to the NEFs. In this case, the NEFs may also be managed and controlled and connect to the third party ASs via the APIs provided by the NEF management controller.

Figure 2:
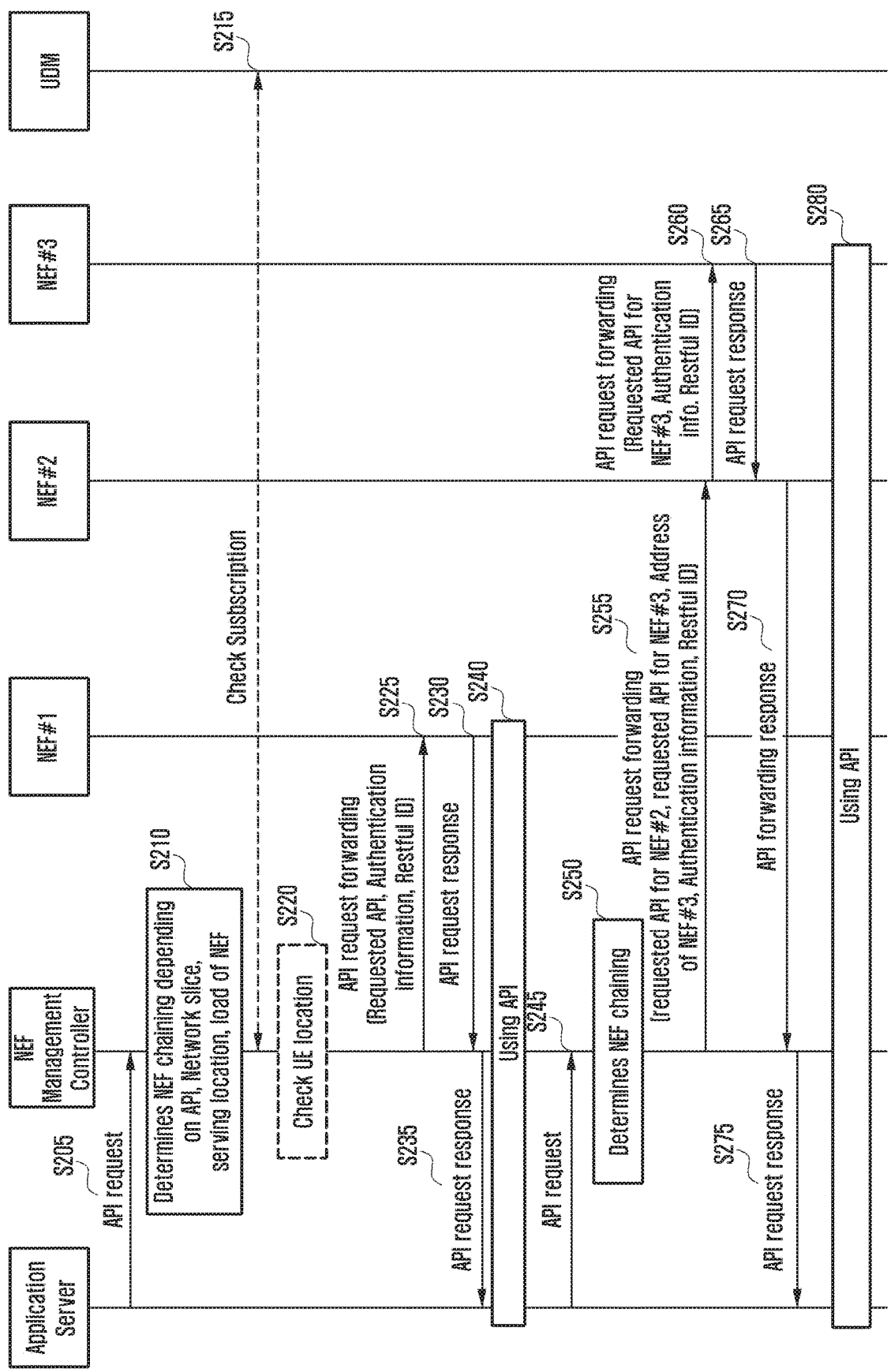
FIG. 2 is a signal flow diagram illustrating a procedure for discovering NEFs and chaining selected NEFs according to a request from a third party application server (AS) according to an embodiment of the disclosure.
Figure 3:
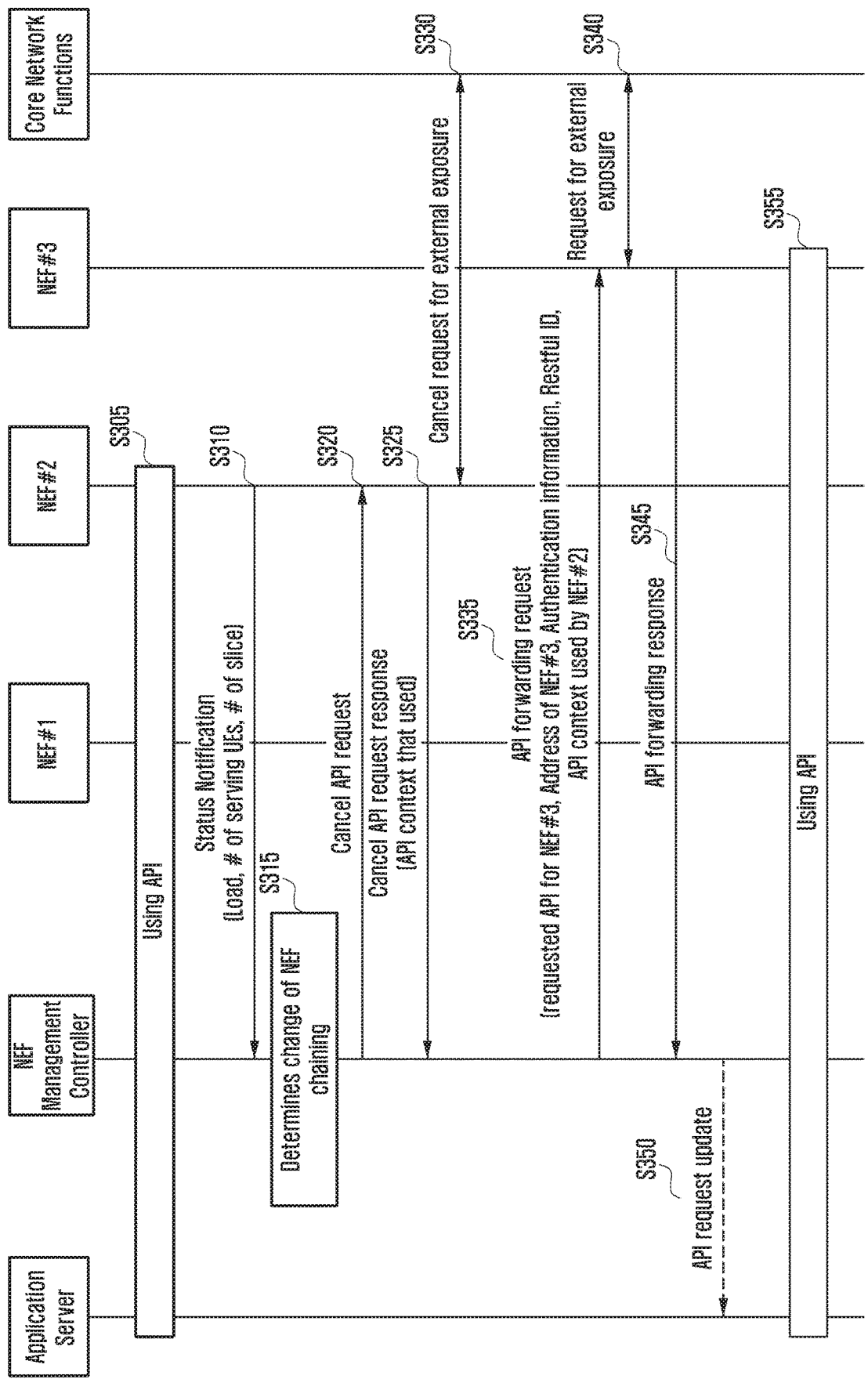
FIG. 3 is a signal flow diagram illustrating a procedure for changing an NEF of an NEF chaining providing APIs for another NEF according to an embodiment of the disclosure.

On the basis of the above descriptions, the disclosure is described by way of various embodiments illustrated in FIGS. 1, 2, and 3.

FIG. 1 is a signal flow diagram illustrating a procedure for registering APIs for use by NEFs according to an embodiment of the disclosure.

According to an embodiment of the disclosure, each NEF sends, at operation S105, an NEF management controller an API registration request message including at least one of supporting API lists, a serving area, and a serving network slice. The API registration request message may include at least one of the aforementioned three types of information and is not limited by name; if there is any message conveying the corresponding information transmitted from an NEF to a function managing NEFs, this message, although called by a different name, can be used as being transmitted for the same purpose. Upon receipt of the API registration request message, the NEF management controller may ascertain the supporting APIs, serving areas, and serving network slices based on the information transmitted by the NEF and store the ascertained information.

At operation S110, the NEF management controller may send an API registration response message to the NEF (NEF #1 of FIG. 1) that has transmitted the API registration request message, and the API registration response message may include authentication information. The authentication information may be transmitted in order for the NEF management controller to authenticate supportability of the corresponding APIs, serving area, and serving network slice. The authentication information may also be included in an APR request (or API Trigger or API Invoke) message being transmitted afterward from the NEF management controller to the NEF and, upon receipt of this message, the NEF may identify the NEF management controller based on the authentication information and verify the message.

According to an embodiment of the disclosure, the NEF management controller may subscribe to receive status notification from the NEF by transmitting a status notification subscription message to the NEF as operation S115, the status notification subscription message including requests for status information (e.g., processing load, number of serving terminals, number of serving network slices, and signaling overhead status). The API status subscription message transmitted by the NEF management controller may also include a threshold value for use in determining the processing load and load information report periodicity. The NEF may send the NEF management controller a response at operation S120 in reply to the subscription to acknowledge the subscription and, afterward, transmit a status notification message to the NEF management controller at operation S145 when its status changes or the processing load becomes greater than the threshold value or at the periodicity requested by the NEF management controller. A detailed description related to this embodiment is made later with reference to FIG. 3.

The NEF #2 operates in the same manner as the NEF #1 to send the NEF management controller its supporting API list, serving area, and serving network slice information for registration at operations S125 and S130. Although referred to as an API registration procedure for convenience of explanation, the procedure for an NEF to register its supporting APIs with another network function is not limited by the name and may be called by a different name in terms of transmitting the serving area and serving network slice information as well as the API information.

After transmitting the status notification subscription message in operation S135, the NEF management controller may configure an NEF chaining at operation S140. For example, it is possible to compose a set of NEFs in an API-specific manner, e.g., NEF #1 for a terminal using mobility-related APIs and NEF #2 for a terminal using session-related APIs. The NEF management controller performs the NEF chaining based on the information received from the NEFs.

According to an embodiment of the disclosure, after the NEFs register their supporting APIs, serving area, and network slice with the NEF management controller through the API registration procedure, an identifier (ID) may be assigned for the connection between the two entities. In this case, the API registration response message transmitted from the NEF management controller to the NEF may include the ID. The NEF management controller may assign the ID in the form of a Representational state transfer-ful (RESTFUL). The RESTFUL denotes server-client network architecture using REST principles. The REST principles are characterized by defining a network structure as resources and designating addresses to the resources to configure the corresponding resources or obtain a value.

The NEF management controller may use a method as follows when it connects to an NEF. It is assumed that each network function structuralizes context/data into resources and builds a mutual structure system. The mutual structure system may mean structuralization of the names of mutually necessary data. Suppose that a uniform resource identifier (URI) is shared. For example, if the NEF management controller determines to use a location-related API among the APIs available for use by the NEF, it may assign a URI in the form of <NEF Management Controller ID>.<Location API>.<Serving Area>.<Serving Network Slice> and send the URI to the NEF. Afterward, a procedure may be performed by transmitting/receiving a command in the form of <NEF Management Controller ID>.<Location API>.<Serving Area>.<Serving Network Slice>.Invoke( ) through the API request message for acquiring location information of the terminal. It may be possible to assign multiple NEF management controller IDs according to the number of APIs that the NEF registers as supportable APIs with the above URI format. The NEF may determine the type of requested API based on the predefined URI format.

FIG. 2 is a signal flow diagram illustrating a procedure for discovering NEFs and chaining selected NEFs according to a request from a third party AS according to an embodiment of the disclosure.

Referring to FIG. 2, the NEF management controller may be located inside or outside a mobile communication network. In the case of being located outside the mobile communication system, the NEF management controller may communicate with the NEFs based on service level agreements. In the case of being outside the mobile communication system, the NEF management controller may be regarded as an NEF, which is distinguished, however, from other NEFs in terms of having a function for managing other NEFs.

At operation S205, the third party AS requests to the NEF management controller for APIs available for use of an exposure function necessary to serve a terminal. This API request message may include an ID of the terminal the AS serves, information on the network slices the AS supports for serving the terminal, and information on the areas where the AS provides its services.

Upon receipt of the API request message, the NEF management controller checks the API lists of the NEFs registered as described in the embodiment of FIG. 1. Although not following the procedure depicted in the FIG. 1, the NEF management controller may acquire the NEF information according to the service level agreements among the mobile communication operators or from a device managing the network or through a pre-configuration made in advance within the network. Regardless of the method used for acquiring the NEF information, the NEF management controller has the information on per-NEF supporting APIs, per-NEF serving areas, per-NEF serving network slices, and per-NEF load before starting the procedure of the present embodiment. Here, the NEF management controller may ascertain serving area information and serving network slice information along with the API lists when the NEFs registers their supporting APIs. If the API request message from the AS includes an ID of a terminal, the NEF management controller may send the terminal ID to a user data management (UDM) (a management function connected to a database storing subscriber information) to inquire whether the network is currently serving the terminal and to locate the terminal. The NEF management controller may also inquire to the UDM at operations S215 and S220 whether the corresponding AS can use the corresponding API (as another example, the NEF management controller may manage whether the corresponding AS can use the corresponding API or acquire the corresponding information from a network entity that is responsible for managing the service level agreements in the mobile communication network).

After ascertaining the list of the NEFs that can support the APIs upon receipt of the request from the AS, the NEF management controller selects the most suitable NEF at operation S210. The NEF selection is made as follows. The NEF management controller selects the best NEF based on the information received from the AS (i.e., requested API, serving area, and/or serving network slice) and the information ascertained from the UDM (i.e., an API for use by the terminal or current location of the terminal). For example, the NEF management controller may select an NEF supporting the serving area and serving network slice of the AS among the NEFs supporting the requested API. As another example, the NEF management controller may select an NEF located closest to the current location of the terminal or having the least load currently. In this manner, the NEF management controller may select an NEF for supporting the requested AS in consideration of the aforementioned conditions, and it may be possible to select an NEF based on a combination of two or more conditions. It may also be possible to select an NEF based on only the information stored in the NEF management controller among the aforementioned information.

After selecting the best NEF, the NEF management controller may forward the API request message to the selected NEF at operation S225. The forwarded API request message may include the API requested by the AS, authentication information transmitted from the NEF management controller to the NEF during the API registration, or an ID assigned by the NEF management controller in association with the request. According to an embodiment of the disclosure, the NEF management controller may assign the ID in a RESTFUL format. The RESTFUL denotes server-client network architecture using REST principles. The REST principles are characterized by defining a network structure as resources and designating addresses to the resources to configure the corresponding resources or obtain a value. The NEF management controller may use a method as follows when it connects to an NEF. It is assumed that each network function structuralizes context/data into resources and builds a mutual structure system. The mutual structure system may mean structuralization of the names of mutually necessary data.

Suppose that a URI is shared. For example, if the NEF management controller determines to use a location-related API among the APIs available for use by the NEF, it may assign a URI in the form of <NEF Management Controller ID>.<Location API>.<Serving Area>.<Serving Network Slice> and send the URI to the NEF. Afterward, a procedure may be performed by transmitting/receiving a command in the form of <NEF Management Controller ID>.<Location API>.<Serving Area>.<Serving Network Slice>.Invoke( ) through the API request message for acquiring location information of the terminal. It may be possible to assign multiple NEF management controller IDs according to the number of APIs that the NEF registers as supportable APIs with the above URI format. The NEF may determine the type of requested API based on the predefined URI format. The RESTFUL ID may be configured as a combination of at least one of the NEF management controller ID, NEF ID, API name, serving area, serving network area, and name of the AS that has made the request. If it is possible to use this ID to identify the API request, the ID may be configured by combining the aforementioned information in various manners.

According to an embodiment of the disclosure, the ID may include an ID for identifying a transaction between two entities (NEF management controller and NEF). This can distinguish between request and response messages and identify the transaction established using the RESTFUL ID.

The NEF sends the NEF management controller an API response message at operation S230 to acknowledge the receipt of the API request. The API response message may include the transaction ID at the previous operation. The API response message may include the RESTFUL ID assigned, by the NEF management controller, as an ID of the connection established with the NEF management controller.

The NEF management controller forwards the API response message to the AS at operation S235 to notify that the requested API is available and indicate the ID for use of the API. This ID may be the RESTFUL ID assigned by the NEF management controller. This ID may be a reference ID available only between the AS and the NEF management controller. The reference ID is an ID for use in identifying a mutual connection rather than for use in state management.

If the reference is assigned to the AS, the AS sends the NEF management controller an API message to use the corresponding API at operation S240. Upon receipt of the API message, the NEF management controller forwards the API message with a RESTFUL ID to the NEF to use the API and sends a message forwarding result to the AS. As another example, upon receipt of the RESTFUL ID, the AS may request to the NEF for an API directly using the RESTFUL ID. If the RESTFUL ID includes an NEF ID, the AS may send a DNS query about the URI composing the RESTFUL ID to a DNS server to acquire the address of the corresponding NEF and then send the API request to the identified NEF directly. In this case, the API request may be directly delivered to the NEF without passing through the NEF management controller. That is, NEF management controller may determine whether the AS has to connect to the NEF directly or via the NEF management controller to use the API depending on the type of the ID received from the AS. It may be necessary to specify that a mobile communication operator that wants to hide the information on the NEFs located in its network is obliged to use the API through the NEF management controller.

According to an embodiment of the disclosure, the AS may request to the NEF management controller for an API at operation S245, and the NEF management controller discovers and selects the NEF as described above to determine NEF chaining for use of the API at operation S250. For example, when a request is received from an AS serving Seoul, the NEF management controller may connect the NEF serving Seoul to the NEF serving Gangnam-gu in which the terminal is currently located through NEF chaining to process the API request and provide the corresponding terminal with a service. Composing NEF chaining may mean connecting two or more NEFs to each other according to an API request. Such NEF chaining may be called an NEF group in terms of connecting multiple NEFs.

This embodiment may be applied to a scenario of using the NEF located close to the terminal. For example, in the case of terminal session control to a local AS for mobile edge computing, it is important to assign the local AS closest to the terminal, and it is necessary for a local NEF connected to the local AS to support the corresponding terminal. This is helpful for event processing or provisioning or for performing a low latency task such as small data transmission.

In another scenario, the NEF management controller may compose a chaining such that NEF #2 supports a mobility management-related API requested by the AS while NEF #3 supports a session management-related API requested by the AS. This is because the mobility control should be designed to cover a relative large area (e.g., unit of tracking area), while the session control should be designed to make a quick determination and perform a signaling procedure in a relatively small area (e.g., in a unit of a cell). It may also be possible to compose a chaining according to the load levels of the NEFs. It may be possible to compose a chaining such that the NEF #2 having an optimum level of the load supports an API generating a relatively small load, while the NEF #3 having a low level of the load supports an API generating a relatively large load. In this manner, the NEF management controller may compose an NEF chaining with the NEFs that are optimally selected depending on the scenario.

At operation S255, the NEF management controller forwards the API request message received from the AS to the NEF #2. The API request message may include the authentication information that the NEF management controller has assigned to the NEF and the ID as an ID for the request, which also has been assigned by the NEF management controller. This ID may be assigned in the RESTFUL format as descried above. The NEF management controller may include the API supported by NEF #2 and the API supported by NEF #3 distinctively in the API request message. The NEF management controller may provide the NEF #2 with the addresses of the NEF #3 for use by the NEF #2 to identify the NEF #3.

Upon receipt of the API request message, the NEF #2 authenticates the API it will provide and stores the authentication result. Next, the NEF #2 forwards the API request message to the NEF #3 at operation S260. This authentication message maintains the format as received by the NEF #2 and includes the authentication information and RESTFUL ID. The NEF #3 performs authentication thereon and sends an API request response message to the NEF #2 at operation S265, and the NEF #2 forwards the API response message to the NEF management controller at operation S270. Upon receipt of the API response message, the NEF management controller ascertains that the NEF #2 and NEF #3 can support the requested API. Afterward, the NEF management controller sends an API response message to the AS at operation S275 in reply to the API request message, and the AS uses the API at operation S280. The API can be used in the same manner as described above (including the operation assigning a reference ID to the AS).

According to an embodiment of the disclosure, the NEF management controller may send the API response message to the AS in reply to the API request message after selecting the best NEF as an alternative to the embodiment where the NEF management controller selects an NEF and sends the API request to the NEF on behalf of the AS and responds to the API request. This API response message may include at least one of the information on the selected NEF (address or ID), information on the API requested by the AS, authentication information that the NEF management controller has assigned to the NEF during the API registration, and an ID that the NEF management controller has assigned as an ID of the request. The API information included in the API response message may be provided in the same RESTFUL ID format as described in the above embodiment. Upon receipt of the API response message, the AS may send an API use request message to the corresponding NEF directly based on the NEF information and API information. The API use request message may include the authentication information that the NEF management controller has sent to the NEF during the API registration such that the NEF determines whether to accept the request from the AS based on the authentication information. The NEF may send an API use response message to provide notification that the API use request has been accepted in response to the API use request message, and the API use response message transmitted from the NEF to the AS includes the aforementioned ID for verifying that the API use response message is transmitted in response to the API use request message.

The above description has been directed to the procedure where the NEF management controller chains multiple NEFs to respond to the API request from the AS, particularly in the case that the API request is relayed to one NEF (NEF #2) and then to another NEF (NEF #3).

The NEF management controller may compose a chaining in a certain order as follows. First, the NEF management controller may compose a chaining in such a way of selecting an NEF supporting a mobility management-related API and then an NEF supporting a session management-related API. This is advantageous when the NEF supporting the mobility management-related API covers a larger service area while the NEF supporting the session management-related API is a localized NEF. That is, it may be possible to compose the chaining by selecting NEFs in descending order of coverage area, i.e., selecting the NEF covering the largest area first and the NEF covering the smallest area last, on the basis of the information on the areas where individual NEFs support the APIs.

Second, it may be possible to compose a chaining in an order of a number of supporting APIs. For example, it may be possible to chain the NEFs by selecting the NEF having the largest number of supporting APIs matching the requested APIs and then an NEF supporting APIs that are not supported by the previously selected NEF. This aims to make it possible for an API call from the third party server to arrive at and to be processed first by the first NEF of a chained NEF group. The method is advantageous in that most API calls are processed by the first NEF without passing through several hops.

That is, the NEF management controller may select NEFs supporting the APIs to be provided to the corresponding AS, determine the NEFs of which APIs are used among the selected NEFs, and chain the NEFs in an order of the numbers of APIs provided by the NEFs. If there are multiple NEFs having the same number of APIs to provide, the chaining order may be determined based on the first condition or the third or fourth condition to be described below.

Third, the NEF management controller may chain the NEFs by selecting based on distance from the third party AS, i.e., selecting the NEF located physically closest to the third party AS and then the NEF next closest to the AS.

Fourth, the NEF management controller may compose an NEF chaining in such a way of ascertaining the loads of NEFs and selecting the NEF with the smallest load first (i.e., ascending order of load).

It may be possible to use any combination of the four above-described schemes. For example, if the NEF supporting the largest number of APIs is located far from the third party server, the NEF supporting the next largest number of APIs may become the first node of the NEF chaining. Which condition is dominant may be determined by the service provider.

It may also be possible that the NEF management controller may directly connect to the NEFs rather than chaining the NEFs to provide APIs. That is, the NEF management controller may process the API request in such a way of performing the procedure of operations S205 to S240 performed with the NEF #1 with the NEF #2 and NEF #3 independently or in parallel, and this procedure may be understood differently from the case of chaining the NEFs in a predetermined order. If the API provisioning procedure is performed independently or in parallel with the individual NEFs without any chaining order, it may be possible to divide the NEFs into an NEF group such that an API request is delivered to the NEFs constituting the NEF group.

The procedure for the NEF management controller to chain multiple NEFs may be performed immediately after the NEF registration procedure of the embodiment of FIG. 1 or in the procedure for the NEF management controller to receive the API request from the AS. The former is applicable to the case where a scenario such as a network slicing or requirements of the service and information to be provided are predetermined. That is, the NEF management controller may compose service-specific NEF chainings in advance and, if an API request is received from the AS, select one of the pre-composed NEF chainings. The latter is applicable to the case where the requirements and information to be provided are determined according to the API request received from the AS. That is, the NEF management controller may manage a plurality of registered NEFs and, if an API request is received from the AS, then may select one or more NEFs supporting the requested APIs to compose an NEF chaining.

A description is made of the procedure for changing an NEF of an NEF chaining for another hereinafter with reference to FIG. 3.

FIG. 3 is a signal flow diagram illustrating a procedure for changing an NEF of an NEF chaining providing APIs for another NEF according to an embodiment of the disclosure.

In the situation where the AS is using, at operation S305, the APIs selected in the procedure of FIG. 2, the NEF management controller may receive, at operation S310, a status notification message described in the embodiment of FIG. 1. Even though the procedure of the embodiment of FIG. 1 is not used, it may be possible to acquire the status information from a device monitoring and managing per-NEF loads in the mobile communication network. Upon receipt of the status notification message, if it is determined that the network load reaches a significant level, the NEF does not fulfil its function any more, the number of serving network slices of the NEF is too high, or two or more conditions are combined, the NEF management controller may determine, at operation S315, a necessity of a new NEF supporting the corresponding API.

At operation S320, the NEF management controller may send the NEF #2 a Cancel API Request message for providing an instruction to cancel the API in use. In response to the Cancel API Request message, the NEF #2 sends, at operation S325, the NEF management controller a Cancel API Response message including an API context used in connection with the AS. The API context includes at least one of configuration information for a mobility event that is requested to the NEF #2 (session ID, routing path, etc.) and information that the NEF #2 has retained for interaction with a core network (CN) function. This information may be used by a newly selected NEF. By transmitting the API context to confirm the API cancellation, the NEF #2 notifies, at operation S330, the CN function to which it has connected of the cancellation of the use of the external exposure function.

Upon receipt of the Cancel API Request message from the NEF #2, the NEF management controller sends, at operation S335, an API request message to the NEF #3 selected as a new NEF for supporting the corresponding API. This API request message may be generated in the same format as the messages used in the embodiment of FIG. 2. However, the API request message being transmitted at operation S335 may include the API context conveyed in the Cancel API Response message from the NEF #2. Upon receipt of the API Request message, the NEF #3 requests to the CN function for new external exposure at operation S340 using context that has been used by the NEF #2. This means that the same API is used in view of the third party AS, even though there is a leg change between the NEF and the CN function.

After agreeing the external exposure with the CN, the NEF #3 sends the NEF management controller a response to notify the NEF management controller of the completion of the procedure at operation S345. Then, the NEF management controller assigns a reference ID for identifying the connection with the NEF #3 and sends an API request update message to the AS at operation S350. The AS may use the API with the newly updated reference ID at operation S355, and the NEF management controller ascertains the use of the new API based on the API request message addressed to the NEF #3. If the AS connects to the NEF #3 directly, the NEF management controller may notify the AS of the RESTFUL ID assigned to the NEF #3 in order for the AS to use the API continuously with the corresponding ID.

Figure 4:
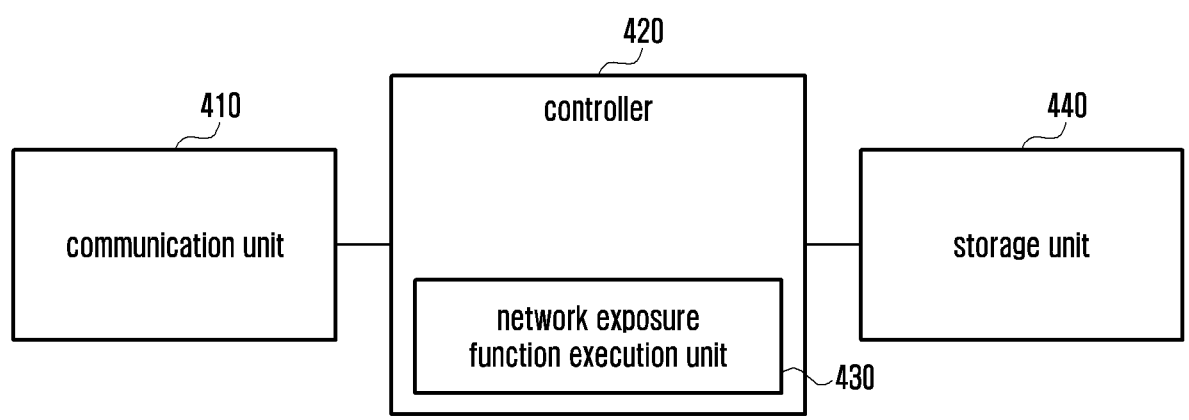
FIG. 4 is a block diagram illustrating a configuration of an NEF according to an embodiment of the disclosure.

FIG. 4 is a block diagram illustrating a configuration of an NEF according to an embodiment of the disclosure.

Referring to FIG. 4, the NEF may include a communication unit 410, a controller 420, and a storage unit 440. In the following description, the controller 420 may be defined as a circuit, an application-specific integrated circuit, or at least one processor and include a NEF execution unit 430.

The communication unit 410 may transmit and receive signals to and from network entities, network functions, and network nodes. The communication unit 410 may communicate with the network entities, network nodes, and network functions through a wireline or a radio link established by means of a radio frequency (RF) module.

The controller 420 may control overall operations of the NEF according to the above-described embodiments. For example, the controller 420 may send the NEF management controller a registration request and report its status to the NEF management controller.

The NEF execution unit 430 may send capability information to an external AS to expose the capabilities to the network according to a control command from the NEF management controller. For example, the NEF execution unit 430 may analyze and process an API request from the AS and send the processing result to a network entity, a network node, or a network function providing the corresponding function. Meanwhile, it is obvious that the controller 420 can take charge of the aforementioned role of the NEF execution unit 430.

The storage unit 440 may store at least a part of the information transmitted and received by the communication unit 410 and the information generated by the controller 420.

Figure 5:
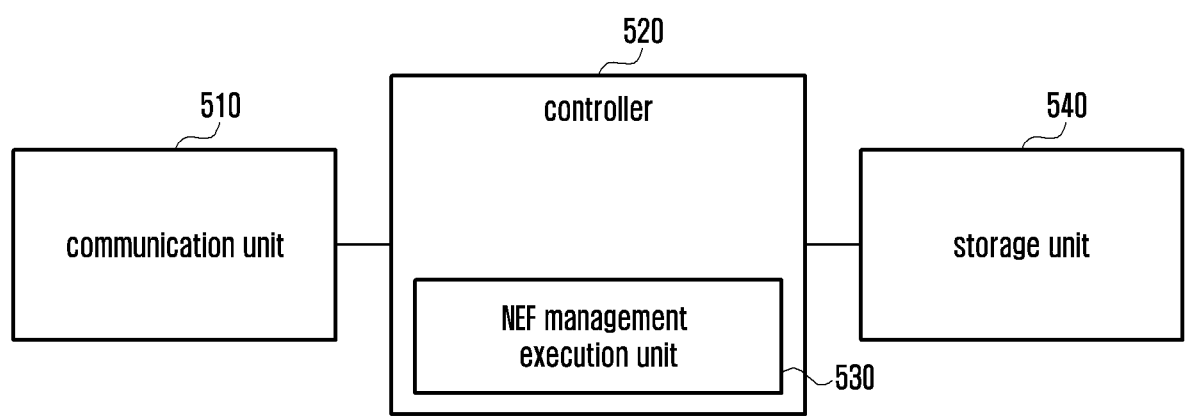
FIG. 5 is a block diagram illustrating a configuration of an NEF management controller according to an embodiment of the disclosure.

FIG. 5 is a block diagram illustrating a configuration of an NEF management controller according to an embodiment of the disclosure.

Referring to FIG. 5, the NEF management controller may include a communication unit 510, a controller 520, and a storage unit 540. In the following description, the controller 520 may be defined as a circuit, an application-specific integrated circuit, or at least one processor and include a NEF management function execution unit 530.

The communication unit 510 may transmit and receive signals to and from network entities, network functions, network nodes, and ASs. The communication unit 510 may communicate with the network entities, network nodes, and network functions through a wireline or a radio link established by means of an RF module.

The controller 520 may control overall operations of the NEF management function according to the above-described embodiments. For example, the controller 520 registers and manages NEFs and composes NEF chaining according to a request from an AS.

The NEF management function execution unit 530 may register, assort, and manage NEFs according to a registration request from a NEF and cancel supporting API request or select a new NEF according to a status report from the NEF. The NEF management function execution unit 530 may analyze the API request received from an AS and compose NEF chaining (or NEF group) for providing the requested function. Meanwhile, it is obvious that the controller 520 can take charge of the aforementioned role of the NEF management function execution unit 530.

The storage unit 540 may store at least a part of the information transmitted and received by the communication unit 510 and the information generated by the controller 520.

Figure 6:
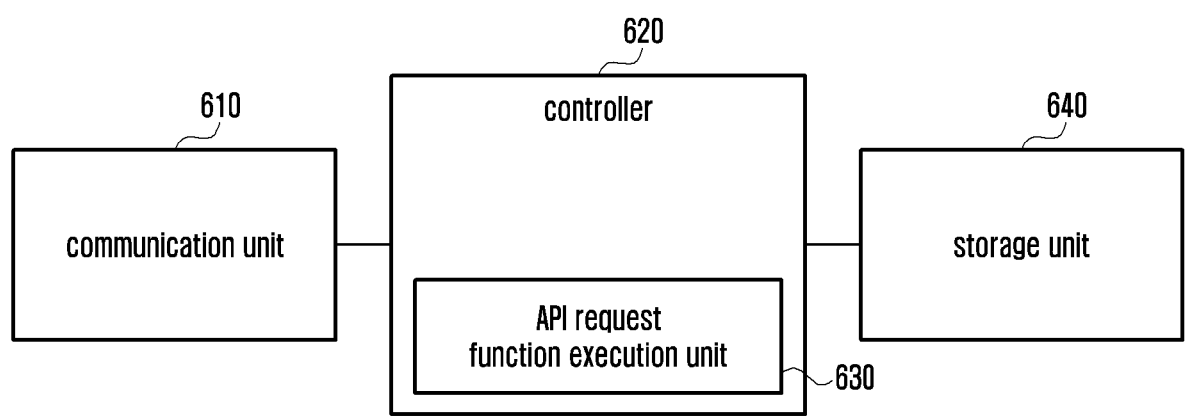
FIG. 6 is a block diagram illustrating a configuration of a third party AS according to an embodiment of the disclosure.

FIG. 6 is a block diagram illustrating a configuration of a third party AS according to an embodiment of the disclosure.

Referring to FIG. 6, the third party AS may include a communication unit 610, a controller 620, and a storage unit 640. In the following description, the controller 620 may be defined as a circuit, an application-specific integrated circuit, or at least one processor and include an API request function execution unit 630.

The communication unit 610 may transmit and receive signals to and from network entities, network functions, and network nodes. The communication unit 610 may communicate with the network entities, network nodes, and network functions through a wireline or a radio link established by means of an RF module.

The controller 620 may control overall operations of the AS according to the above-described embodiments. For example, the controller 620 may request for an API to an NEF management controller or directly to an NEF.

The API request function execution unit 630 may request to the network for a function or information necessary for providing a terminal with a service. The API request function execution unit 630 may exchange API request and response messages with the network to provide the terminal with the service. Meanwhile, it is obvious that the controller 620 can take charge of the aforementioned role of the API request function execution unit 630.

The storage unit 640 may store at least a part of the information transmitted and received by the communication unit 610 and the information generated by the controller 620.

As described above, the disclosure is advantageous in that a 5G mobile communication operator is capable of providing terminals with various third party services by connecting network functions constituting the 5G system to an NEF, which exposes the information on the terminals to the NEF. The 5G mobile communication operator is capable of changing a terminal mobility management configuration and configuring terminal-mobility management context, subscribing to a mobility management event of the corresponding terminal, configuring session management and session management context of the corresponding terminal, configuring charging information of the terminal, and transmitting small data for the corresponding terminal.

The disclosure achieves advantageous effects as follows by chaining NEFs.

First, it is possible to configure NEFs by chaining API functions per service. For example, in the case of a device tracking service, it is possible to provide the service using only mobility-related APIs (NEFs providing session-related APIs may be ruled out). In the case of a mobile edge communication service, it is necessary to provide connectivity to a local NEF through chaining depending on the location of the current terminal in order to administer the service in a specific area by configuring a local AS and a local NEF together. In the case of a service of managing terminals by group, the NEF may exist per area because the group members may be distributed in entire service areas. According there is a need of chaining the distributed NEFs for providing the service.

Second, it is possible to configure NEFs by chaining APIs per network slice. For example, it is possible to differentiate between an enhanced mobile broadband (eMBB) slice and a massive Internet of things (IoT) slice for capability exposure. The network slice-specific NEF configuration is useful because a service contract or charging may be made per network slice (e.g., if a specific network slice is leased to a third party, a NEF is separately configured for use by the corresponding network slice).

Third, it is possible to configure NEFs to hide a deployment topology of NEFs as CN entities from third party ASs. The NEF deployment may be optimized in such a way of installing a mobility-related NEF to cover a large area and a session-related NEF per area. It may be possible to configure the NEFs such that the APIs provided by the NEFs can be used always through an entry NEF.

Fourth, it may be possible to develop and deploy NEFs modularized per API or area. For example, in the case of multi-access edge computing (MEC), it is possible to develop a local server and a local NEF together and, in this case, the local NEF may have only the session-related function. A macro NEF that searches for local NEFs has only the mobility-related function to identify local NEFs in a terminal location-specific manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a first network node for managing at least one second network node in a wireless communication system, the method comprising:
    receiving, from at least one second network node, application programming interface (API) information related with each of the at least one second network node;
    transmitting, to the at least one second network node, a response for the API information;
    receiving, from an external server, a request to discover an API;
    identifying a second network node from the at least one second network node based on the request and the API information of the at least one second network node; and
    transmitting, to the external server, a response including API information of a third network node,
    wherein a request of the API is transmitted from the external server to the third network node based on the API information of the third network node included in the response, and is forwarded from the third network node to the second network node, and
    wherein the second network node provides the API to the external server.

2. The method of claim 1, wherein the API information of the at least one second network node comprises at least one of a service API name, a service API type, or an address of the at least one second network node.

3. The method of claim 1, further comprising storing the received API information.

4. The method of claim 1,
    wherein the response for the API information comprises information for identifying an API of each of the at least one second network node,
    wherein the third network node is an entry point to a network node chaining and is identified from the at least one second network node, and
    wherein the network node chaining comprises the second network node.

5. A first network node for managing at least one second network node in a wireless communication system, the first network node comprising:
    a transceiver configured to transmit and receive a signal; and
    a controller configured to control to:
        receive, from at least one second network node, application programming interface (API) information related with each of the at least one second network node,
        transmit, to the at least one second network node, a response for the API information,
        receive, from an external server, a request to discover an API,
        identify a second network node from the at least one second network node based on the request and the API information of the at least one second network node, and
        transmit, to the external server, a response including API information of a third network node,
    wherein a request of the API is transmitted from the external server to the third network node based on the API information of the third network node included in the response, and is forwarded from the third network node to the second network node, and
    wherein the second network node provides the API to the external server.

6. The first network node of claim 5, wherein the API information of the at least one second network node comprises at least one of a service API name, a service API type, or an address of the at least one second network node.

7. The first network node of claim 5, wherein the controller is further configured to store the received API information.

8. The first network node of claim 5,
    wherein the response for the API information comprises information for identifying an API of each of the at least one second network node,
    wherein the third network node is an entry point to a network node chaining and is identified from the at least one second network node, and
    wherein the network node chaining comprises the second network node.

9. A method of a second network node in a wireless communication system, the method comprising:
    transmitting, to a first network node managing at least one second network node, application programming interface (API) information related with the second network node;
    receiving, from the first network node, a response for the API information;
    receiving, from a third network node, a request of an API which is transmitted from an external server to the third network node; and
    transmitting, to the external server, a service related with the API,
    wherein the second network node provides the API to the external server,
    wherein the second network node is identified to provide the service related with the API based on a request to discover the API and the API information, the request to discover the API being transmitted from the external server to the first network node, and
    wherein a response is transmitted from the first network node to the external server, the response including API information of the third network node, the request of the API being transmitted from the external server to the third network node based on the API information of the third network node.

10. The method of claim 9, wherein the API information of the second network node comprises at least one of a service API name, a service API type, or an address of the second network node.

11. The method of claim 9, wherein the API information is stored in the first network node.

12. The method of claim 9,
    wherein the response for the API information comprises information for identifying an API of the second network node, wherein the third network node is an entry point to a network node chaining and is identified from the at least one second network node, and wherein the network node chaining comprises the second network node.

13. A second network node in a wireless communication system, the second network node comprising:
   a transceiver configured to transmit and receive a signal; and
   a controller configured to control to:
      transmit, to a first network node managing at least one second network node, application programming interface (API) information related with the second network node,
      receive, from the first network node, a response for the API information,
      receive, from a third network node, a request of an API which is transmitted from an external server to the third network node, and
      transmit, to the external server, a service related with the API,
   wherein the second network node provides the API to the external server,
   wherein the second network node is identified to provide the service related with the API based on a request to discover the API and the API information, the request to discover the API being transmitted from the external server to the first network node, and
   wherein a response is transmitted from the first network node to the external server, the response including API information of the third network node, the request of the API being transmitted from the external server to the third network node based on the API information of the third network node.

14. The second network node of claim 13, wherein the API information of the second network node comprises at least one of a service API name, a service API type, or an address of the second network node.

15. The second network node of claim 13, wherein the API information is stored in the first network node.

16. The second network node of claim 13,
   wherein the response for the API information comprises information for identifying an API of the second network node,
   wherein the third network node is an entry point to a network node chaining and is identified from the at least one second network node, and
   wherein the network node chaining comprises the second network node.

* * * * *